UNITED STATES PATENT OFFICE.

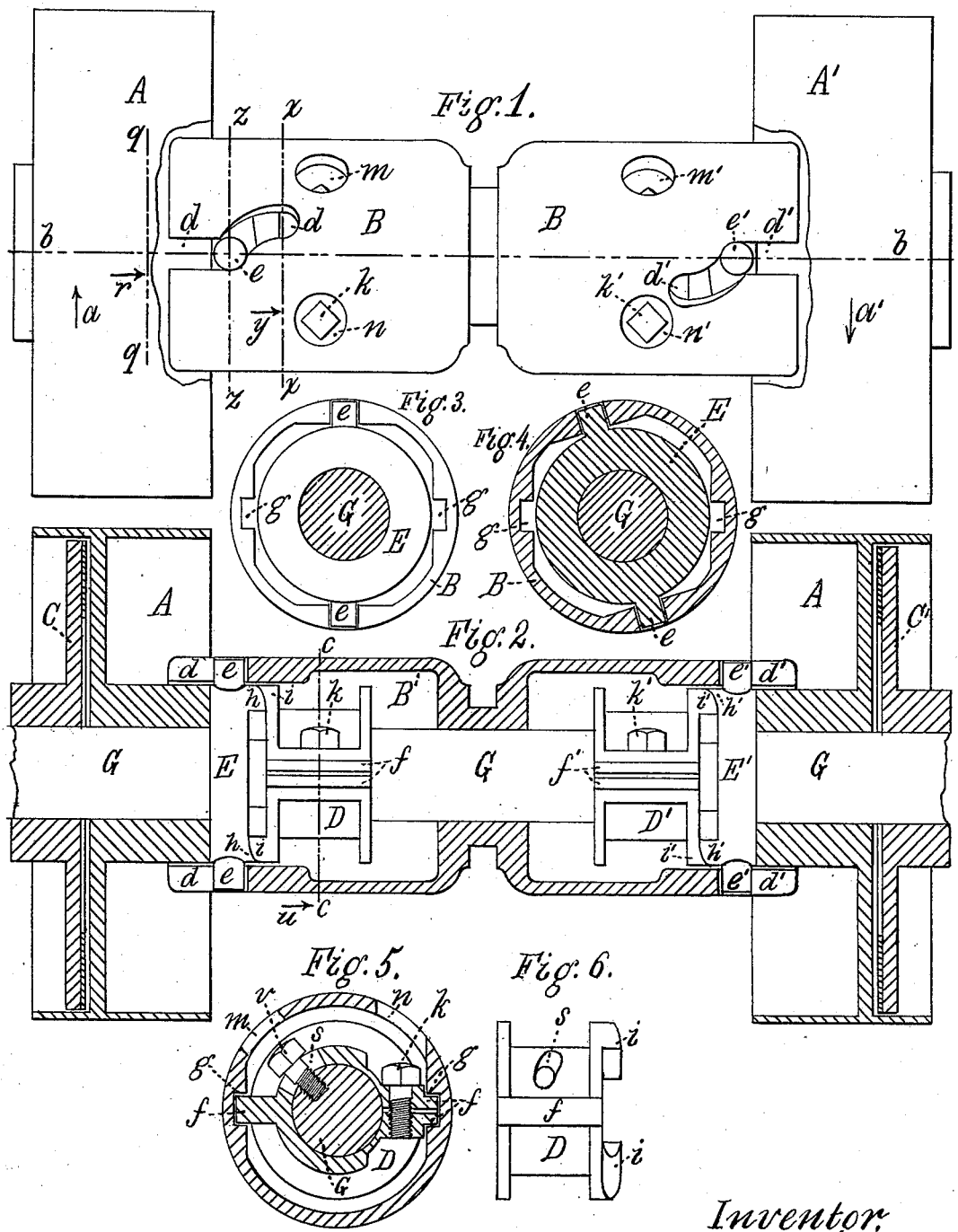

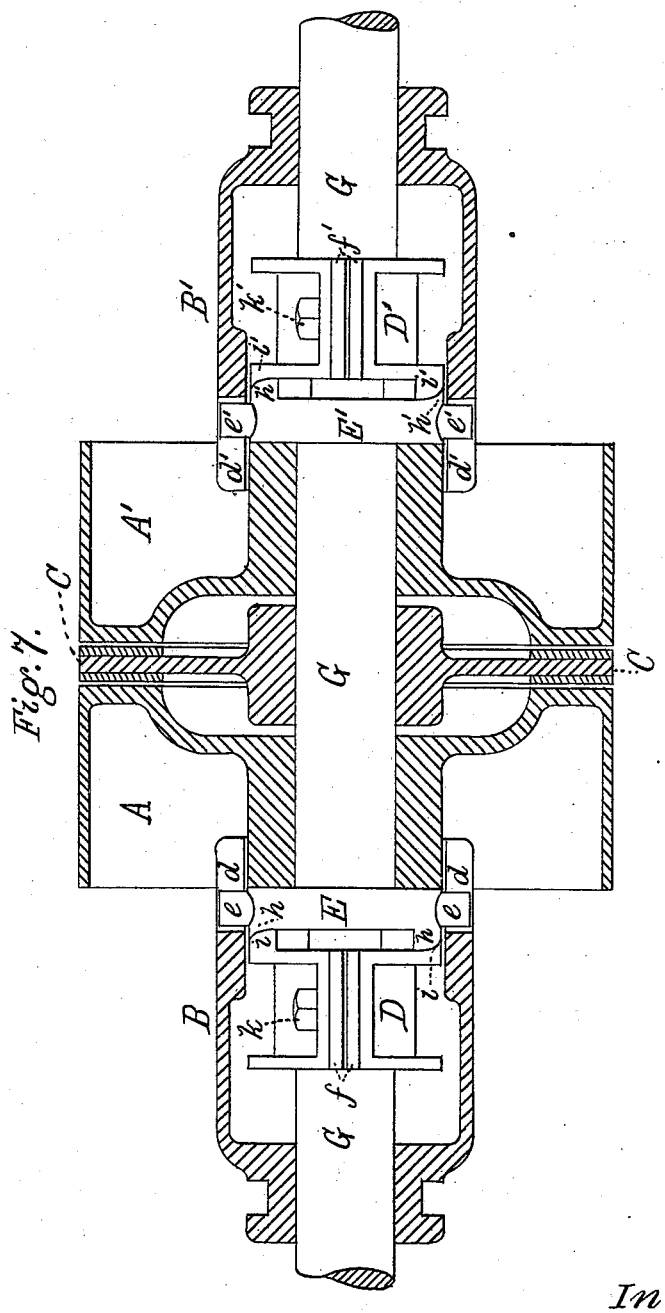

JOSEPH KIRK, OF WORCESTER, MASSACHUSETTS.

FRICTION-CLUTCH.

SPECIFICATION forming part of Letters Patent No. 362,636, dated May 10, 1887.

Application filed July 6, 1886. Serial No. 207,165. (No model.)

*To all whom it may concern:*

Be it known that I, JOSEPH KIRK, a citizen of the United States, residing at Worcester, in the county of Worcester and State of Massachusetts, have invented a new and useful Friction-Clutch Mechanism, of which the following is a specification.

My invention relates to pulleys which are caused at pleasure to communicate motion to the shafts upon which they revolve loose by being pressed tightly against a disk or cone fast on said shaft, the friction thus caused between the pulley and the disk or cone being sufficient to cause the disk or cone, and with it the shaft, to revolve with the pulley.

The object of my invention is to apply the power which presses the pulley against the disk or cone by means of a nut arranged in such manner that the pressure of the pulley against the disk or cone fast on the shaft shall be balanced by an equal and opposite pressure against a part of my mechanism, also fast on the shaft, in which manner all unnecessary and injurious friction and wear of parts in the mechanism are obviated. I attain this object by means of the mechanism illustrated in the accompanying drawings, in which—

Figure 1 is an exterior view of my mechanism applied to two pulleys, A A', supposed to revolve loose on a shaft in opposite directions, as indicated by the arrows *a a'*. A part of the rim of each pulley is removed to show the ends of the shell B. Fig. 2 is a sectional view of my mechanism taken on the line *b b* of Fig. 1, the pulleys A A', the disks C C', and the shell B being shown in section, and the collars D D' and the nuts E E' shown in an exterior view. Fig. 3 is a cross-section of my mechanism taken on the line *q q* of Fig. 1 and looking in the direction of the arrow *r*, the pulley A being removed. This view is intended to show the position of revolution of the nut E with respect to the shell B when said nut is not operated by said shell to throw the pulley A into action. Fig. 4 is a cross-section of my mechanism, taken with respect to the shell B on the line *x x* of Fig. 1 and looking in the direction of the arrow *y*, but in this view the shell B is supposed to have been moved along the shaft toward the pulley A until the line *x x* coincides with the line *z z*, passing through the center of the horns *e e* on the nut E. This view is intended to show the position of revolution of the nut E with respect to the shell B, when said nut is operated by said shell to throw the pulley A into action. Fig. 5 is a cross-section of my mechanism, taken on the line *c c* of Fig. 2, looking in the direction of the arrow *u*, showing the manner in which the collar D is fastened on the shaft G, and the provision made for adjusting said collar. Fig. 6 is a side view of the collar D, the opposite side being shown from that represented in Fig. 2. Fig. 7 is a sectional view showing my mechanism arranged in a slightly different manner from that represented in Figs. 1 and 2, in these views each pulley being provided with a separate disk, and the mechanism being operated by a double-end shell, while in Fig. 7 a single disk, C, is represented, which may be acted upon by either of the pulleys A A', and two shells, B B', are used, which are, however, to be operated together like one piece. I have not in these views shown any arrangement for sliding the shell B or the shells B B' along the shaft G to operate either of the pulleys A A', as this can be accomplished in any usual and well-known manner. I have shown in Figs. 1, 2, and 7 my mechanism applied to two pulleys, by means of which the shaft may be caused at pleasure to revolve in either direction; but I may apply it to a single pulley for driving the shaft in one direction only, if I so desire.

The mechanism by means of which I press a revolving pulley against a disk or cone consists of a nut, E, bearing on one side against the hub of the pulley A, as shown in Fig. 2, a collar, D, and a shell, B. The nut E is loose on the shaft G, and is provided with two horns, *e e*, which fit into the curved slots *d d* in the shell B, and with external inclined faces, *h h*, which fit on corresponding inclined faces, *i i*, on the collar D. The collar D is split on one side, as shown in Fig. 5, and is clamped fast on the shaft by the screw *k*. The collar D has projecting ridges *f f*, which fit into grooves *g g* in the shell B, as shown in Fig. 5. The shell B slides on the shaft G, and by means of the grooves *g g* and the ridges *f f* is prevented from revolving except with the collar D.

In the position of the shell B shown in Figs.

1 and 2 both pulleys A A' are out of contact with their respective disks C C'. When the shell B is moved toward the pulley A, the nut E is turned by the curved slots $d\ d$ of the shell B, and by means of the inclined faces $h\ h$ on the nut E and the corresponding inclined faces $i\ i$ on the collar D is moved along the shaft, pressing the pulley A against its disk C, in which manner the shaft G is caused to revolve, carrying the described mechanism around with it. When the shell B is moved toward the pulley A' the horns $e'\ e'$ of the nut E' remain in the straight part of the slots $d'\ d'$ of the shell B, so that only one pulley at a time can be thrown into operation. The arrangement shown in Fig. 7 is operated in a similar manner to that shown in Figs. 1 and 2, the shells B and B' in Fig. 7 being moved together like one piece.

It will be seen from Figs. 1, 2, and 7 that the direction in which a nut, E or E', is turned to throw a pulley, A or A', into operation is the same as that in which the pulley itself is revolving. I consider this a preferable mode of construction, as the pulley thereby aids to throw itself into operation, but do not limit myself to this form.

The collars D D' are provided with inclined or helical slots $s\ s'$, as shown in Fig. 6. Through these slots run screws $v\ v'$, tapped into the shaft G, as shown in Fig. 5. The collars D D' are adjusted to their proper distances from the pulleys A A' by loosening the clamp-screws $k\ k'$ and turning the collars D D' on the shaft G, in which manner the collars may be moved within the limits of the inclined slots $s\ s'$.

When the arrangement shown in Figs. 1 and 2 is used, the shell B is perforated with holes $n\ n'$, for adjusting the clamp-screws $k\ k'$, and with holes $m\ m'$, for adjusting the screws $v\ v'$. In the arrangement shown in Fig. 7 the holes $m\ m'\ n\ n'$ are unnecessary, as the shells B B' can be slid off from the collars D D' when it is desired to adjust the screws $k\ k'$ or $v\ v'$.

What I claim as my invention, and desire to secure by Letters Patent, is as follows:

1. In a friction-clutch mechanism, the combination, with the driving-shaft and a pulley and disk supported thereon, of a nut, E, an adjustable collar, D, and a shell, B, all supported on said shaft and constructed and operated substantially as shown and described.

2. In a friction-clutch mechanism, the combination, with the driving-shaft and a pulley and disk supported thereon and a nut, E, loose on said shaft, provided with external inclined faces, of an adjustable collar, D, provided with inclined faces secured upon said shaft, and a shell, B, connected with said collar D, for operating the nut E, substantially as set forth.

3. In a friction-clutch mechanism, the combination, with a driving-shaft, a pulley, and disk or cone supported thereon, of a nut loose on said shaft and provided with external inclined faces, and a collar tight on said shaft and provided with inclined faces adapted to engage the inclined faces on said nut, and means for operating the same, substantially as set forth.

JOSEPH KIRK.

Witnesses:
JOHN C. DEWEY,
FRED. W. SMITH.